United States Patent
Leonard et al.

(10) Patent No.: US 9,412,173 B2
(45) Date of Patent: Aug. 9, 2016

(54) METHOD FOR MAPPING AN ENVIRONMENT

(71) Applicants: National University of Ireland, Maynooth, Co. Kildare (IE); Massachusetts Institute of Technology, Cambridge, MA (US)

(72) Inventors: John Joseph Leonard, Newton, MA (US); Michael Kaess, Pittsburgh, PA (US); John McDonald, Co. Meath (IE); Thomas John Whelan, Co. Kildare (IE)

(73) Assignees: National University of Ireland, Maynooth, Co. Kildare (IE); Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/783,215

(22) PCT Filed: Apr. 22, 2014

(86) PCT No.: PCT/EP2014/058079
§ 371 (c)(1),
(2) Date: Oct. 8, 2015

(87) PCT Pub. No.: WO2014/202258
PCT Pub. Date: Dec. 24, 2014

(65) Prior Publication Data
US 2016/0071278 A1    Mar. 10, 2016

Related U.S. Application Data

(60) Provisional application No. 61/837,991, filed on Jun. 21, 2013.

(51) Int. Cl.
*G06T 7/00* (2006.01)

(52) U.S. Cl.
CPC ............ *G06T 7/0071* (2013.01); *G06T 2200/04* (2013.01); *G06T 2200/08* (2013.01);
(Continued)

(58) Field of Classification Search
CPC ............ G06T 2200/04; G06T 2200/08; G06T 2207/10016; G06T 2207/10024; G06T 2207/10028; G06T 2207/20072; G06T 2207/30241; G06T 2207/30244; G06T 2207/30252
See application file for complete search history.

(56) References Cited

PUBLICATIONS

PCT Transmittal of the International Preliminary Report on Patentability of the ISA for PCT/EP2014/058079 dated Dec. 30, 2015; 8 pages.

(Continued)

*Primary Examiner* — Edward Park
(74) *Attorney, Agent, or Firm* — Daly, Crowley, Mofford & Durkee, LLP

(57) ABSTRACT

A method for mapping an environment comprises moving a sensor along a path from a start location (P0) through the environment, the sensor generating a sequence of images, each image associated with a respective estimated sensor location and comprising a point cloud having a plurality of vertices, each vertex comprising an (x,y,z)-tuple and image information for the tuple. The sequence of estimated sensor locations is sampled to provide a pose graph (P) comprising a linked sequence of nodes, each corresponding to a respective estimated sensor location. For each node of the pose graph (P), a respective cloud slice (C) comprising at least of portion of the point cloud for the sampled sensor location is acquired. A drift between an actual sensor location ($P_{i+1}$) and an estimated sensor location ($P_i$) on the path is determined. A corrected pose graph (P') indicating a required transformation for each node of the pose graph (P) between the actual sensor location ($P_{i+1}$) and the start location (P0) to compensate for the determined drift is provided. The sequence of estimated sensor locations is sampled to provide a deformation graph (N) comprising a linked sequence of nodes, each corresponding to respective estimated sensor locations along the path. For at least a plurality of the vertices in the cloud slices, a closest set of K deformation graph nodes is identified and a respective blending function based on the respective distances of the identified graph nodes to a vertex is determined. Transformation coefficients for each node of the deformation graph are determined as a function of the 20 required transformation for each node of the pose graph (P) to compensate for the determined drift. Tuple coordinates for a vertex are transformed to compensate for sensor drift as a function of the blending function and the transformation coefficients for the K deformation graph nodes closest to the vertex.

15 Claims, 4 Drawing Sheets

(52) U.S. Cl.
CPC ............ *G06T2207/10016* (2013.01); *G06T 2207/10024* (2013.01); *G06T 2207/10028* (2013.01); *G06T 2207/20072* (2013.01); *G06T 2207/30241* (2013.01); *G06T 2207/30244* (2013.01); *G06T 2207/30252* (2013.01)

(56) References Cited

PUBLICATIONS

Newcombe, et al.; "KinectFusion: Real-Time Dense Surface Mapping and Tracking;" IEEE International Symposium on Mixed and Augmented Reality 2011; Science and Technology Proceedings; Oct. 26-29, 2011; pp. 127-136.

Strasdat, et al.; "Double Window Optimisation for Constant Time Visual SLAM;" 2011 IEEE International Conference on Computer Vision; Nov. 6, 2011; pp. 2352-2359.

Scherer, et al.; "Using Depth in Visual Simultaneous Localisation and Mapping;" 2012 IEEE International Conference on Robotics and Automation; May 14, 2012; pp. 5216-5221.

PCT Search Report of the ISA for PCT No. PCT/EP2014/058079 dated Jul. 22, 2014.

Written Opinion of the ISA for PCT No. PCT/EP2014/058079 dated Jul. 22, 2014.

4. New region enters volume
1. Camera motion
2. Raycast and reset
3. Extracted point cloud Original surface  Deformation graph  Deformed  Deformed surface
40,401 vertices  299 nodes  deformation graph

METHOD FOR MAPPING AN ENVIRONMENT

CROSS REFERENCE TO RELATED APPLICATIONS

This application is a U.S. National Stage of PCT application PCT/EP2014/058079 filed in the English language on Apr. 22, 2014, and entitled "A METHOD FOR MAPPING AN ENVIRONMENT," which claims the benefit under 35 U.S.C. §119 of provisional application No. 61/837,991 filed Jun. 21, 2013, which application is hereby incorporated herein by reference.

FIELD

The present invention relates to a method and system for mapping an environment.

BACKGROUND

RGB-D SLAM (Simultaneous Localization and Mapping) systems are employed to build up a map from within an unknown environment (without a priori knowledge) using a camera (sensor) which not alone provides image (RGB colour) but also depth (D) information from the environment. Of course, such techniques are not limited to the RGB colour format and are equally applicable to colour formats including YUV, YCC, LAB etc or indeed monochrome or intensity only formats.

In the present specification, a map is any 3-Dimensional representation of the environment including but not limited to a dense 3D point cloud or a mesh based representation of the environment.

The term pose is used in the present specification to refer to the position and orientation (i.e. viewing direction) of the sensor at a given point in time. During the mapping process, the sensor moves through the environment thereby generating a sequence of poses over time. This sequence of poses is referred to as a pose graph, where vertices in the graph represent the poses; and edges in the graph represent the adjacency relationships (and other constraints) between poses.

Locally consistent mapping refers to mapping where the output geometry is locally accurate (e.g. at the scale of ~10 meters) however at a global scale, the geometry can exhibit significant error, referred to as drift, as a result of the accumulation of small scale errors in the local mapping process.

It is an object of the present invention to overcome problems in producing globally consistent maps; that is to say maps which are globally consistent in terms of all measurements made of the area being mapped.

P. Henry, M. Krainin, E. Herbst, X. Ren, and D. Fox, "RGB-D mapping: Using Kinect-style depth cameras for dense 3D modeling of indoor environments," Int. Journal of Robotics Research, 2012 disclose an approach to RGB-D SLAM using visual feature matching in conjunction with Generalised Iterative Closest Point (GICP) to build a pose graph and subsequently build an optimised surfel map of the environment. Working in an offline manner, they contrast the use of pose graph optimisation versus sparse bundle adjustment (SBA) to minimise feature reprojection errors in a strictly rigid transformation framework.

A rigid transformation is typically used in most SLAM systems, whereby only point translation, rotation and projection are used. A non-rigid transformation includes point stretching, shearing, contraction or twisting. Non-rigid transformations are typically more expensive to compute than rigid ones, and sometimes more difficult to parameterise.

A. S. Huang, A. Bachrach, P. Henry, M. Krainin, D. Maturana, D. Fox, and N. Roy, "Visual odometry and mapping for autonomous flight using an RGB-D camera," in Int. Symposium on Robotics Research (ISRR), (Flagstaff, Ariz., USA), August 2011 computes a map by SBA as a post-processing step, by minimising rigid reprojection errors.

G. Hu, S. Huang, L. Zhao, A. Alempijevic, and G. Dissanayake, "A robust RGB-D SLAM algorithm," in Intelligent Robots and Systems (IROS), 2012 IEEE/RSJ International Conference on, pp. 1714-1719, October 2012; and D. Lee, H. Kim, and H. Myung, "GPU-based real-time RGB-D 3D SLAM," in Ubiquitous Robots and Ambient Intelligence (URAI), 2012 9th International Conference on, pp. 46-48, November 2012 disclose attempts to minimise rigid reprojection error for map correction after optimisation.

F. Endres, J. Hess, N. Engelhard, J. Sturm, D. Cremers, and W. Burgard, "An evaluation of the RGB-D SLAM system," in Proc. of the IEEE Int. Conf. on Robotics and Automation (ICRA), (St. Paul, Mass., USA), May 2012 discloses using visual features for camera pose estimation to achieve global consistency using pose graph optimisation. The map is represented by probabilistically reprojecting all point measurements into an octree-based volumetric map, provided by the OctoMap framework, disclosed in A. Hornung, K. M. Wurm, M. Bennewitz, C. Stachniss, and W. Burgard, "OctoMap: An efficient probabilistic 3D mapping framework based on octrees," Autonomous Robots, 2013. OctoMap has the advantage of taking measurement uncertainty into account, being space efficient and implicitly representing free and occupied space. However like most voxel representations, integration of measurements (by raycasting) and non-rigid transformations are computationally expensive to perform.

K. Pirker, M. Ruether, G. Schweighofer, and H. Bischof, "GPSlam: Marrying sparse geometric and dense probabilistic visual mapping," in Proc. of the British Machine Vision Conf., pp. 115.1-115.12, 2011 uses sparse visual features in combination with a dense volumetric occupancy grid for the modeling of large environments. Sliding window bundle adjustment is used with visual place recognition in a pose graph optimisation framework. Upon loop closure the occupancy grid is "morphed" into a globally consistent grid using a weighted average of the log-odds perceptions of each camera for each voxel.

C. Audras, A. I. Comport, M. Meilland, and P. Rives, "Real-time dense RGB-D localisation and mapping," in Australian Conf. on Robotics and Automation, (Monash University, Australia), December 2011 discloses estimating a warping function using both geometric and photometric information for pose estimation but do not make use of a pose graph. Audras et al also rely on rigid reprojection to produce a 3D map reconstruction.

J. Stueckler and S. Behnke, "Integrating depth and color cues for dense multi-resolution scene mapping using RGB-D Cameras," in Proc. of the IEEE Int. Conf. on Multisensor Fusion and Information Integration (MFI), (Hamburg, Germany), September 2012 disclose an octree-based multi-resolution surfel map representation which registers surfel maps for pose estimation and relies on pose graph optimisation for global consistency. A globally consistent map is computed by fusing key views after graph optimisation has completed.

Many of the above techniques are capable of producing globally consistent maps, however they are either unable to operate in real- or near real-time, to efficiently incorporate large non-rigid updates to the map or to provide an up-to-date optimised representation of the map at runtime i.e. while map data is being acquired.

SUMMARY

The present invention provides a method for mapping an environment according to claim 1.

Some embodiments of the invention recognise when a sensor revisits a previous location, known as a loop closure, to provide a geometric constraint to correct for drift.

In other embodiments, this drift can be calculated based on information from other fiduciary sources.

Other aspects of the invention comprise a system for mapping an environment arranged to perform the steps of claim 1; as well as computer program product stored on a computer readable medium which when executed on a computer system performs the steps of claim 1.

The method and corresponding system of the invention permit dense point cloud and/or mesh based-mapping of large scale environments with a cheap commodity sensor.

The method and system can operate in real-time to efficiently update an existing map with a non-rigid map deformation to reflect an optimised pose graph while preserving dense high quality small scale features.

BRIEF DESCRIPTION OF THE DRAWINGS

Embodiments of the invention will now be described, by way of example, with reference to the accompanying drawings, in which.

DESCRIPTION OF THE PREFERRED EMBODIMENT

Embodiments of the present invention are described in conjunction with the Kintinuous system disclosed in T. Whelan, M. Kaess, M. F. Fallon, H. Johannsson, J. J. Leonard and J. B. McDonald. Kintinuous: Spatially Extended Kinect-Fusion. In RSS Workshop on RGB-D: Advanced Reasoning with Depth Cameras, (Sydney, Australia), July 2012 (http://www.cs.nuim.ie/research/vision/data/rgbd2012/Whelan12rssw.pdf); and "Robust Real-Time Visual Odometry for Dense RGB-D Mapping" by T. Whelan, H. Johannsson, M. Kaess, J. J. Leonard, and J. B. McDonald. In IEEE Intl. Conf. on Robotics and Automation, ICRA, (Karlsruhe, Germany), May 2013 (http://www.cs.nuim.ie/research/vision/data/icra2013).

However, it will be appreciated that the present invention can be applied to any mapping system that incrementally produces a map and an estimate of the pose of the sensor as it produces the map.

Figure 1:
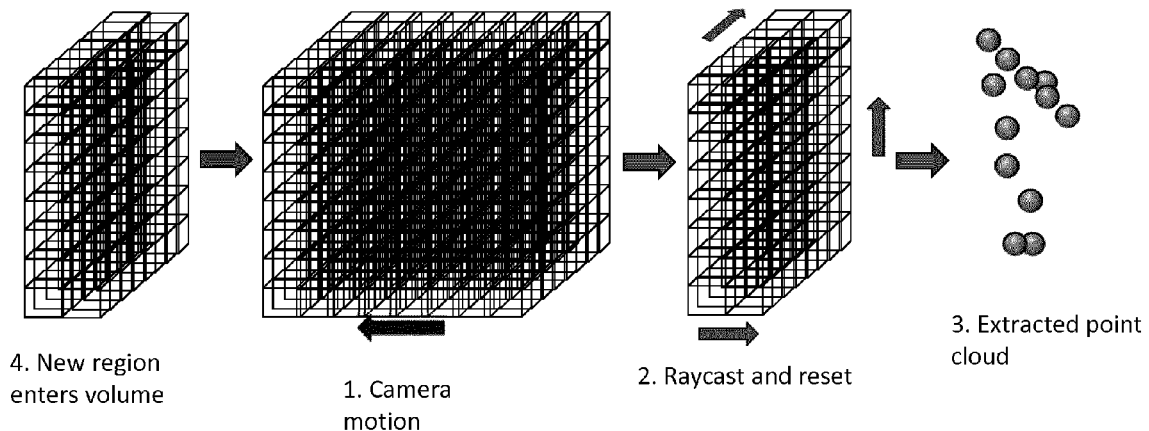
FIG. 1 is a high-level view of the GPU processing involved in the prior art Kintinuous pipeline.

Referring to FIG. 1, Kintinuous, which can use any RGB-D or equivalent sensor, fuses depth and color measurements from the immediate vicinity of the camera into a truncated signed distance function (TSDF) volumetric representation of the scene. As the camera translates through space, this volume virtually translates to follow the camera through space. As the volume translates, parts of the reconstructed volumetric surface are extracted from the TSDF as slices of the point cloud produced for an associated camera pose. These can be subsequently triangulated into a mesh if desired.

Thus it will be seen that the embodiment involves an incremental mapping procedure whereby at any given time, there is a sensor pose estimate available and potentially a part of the map also associated with that pose.

Figure 2:
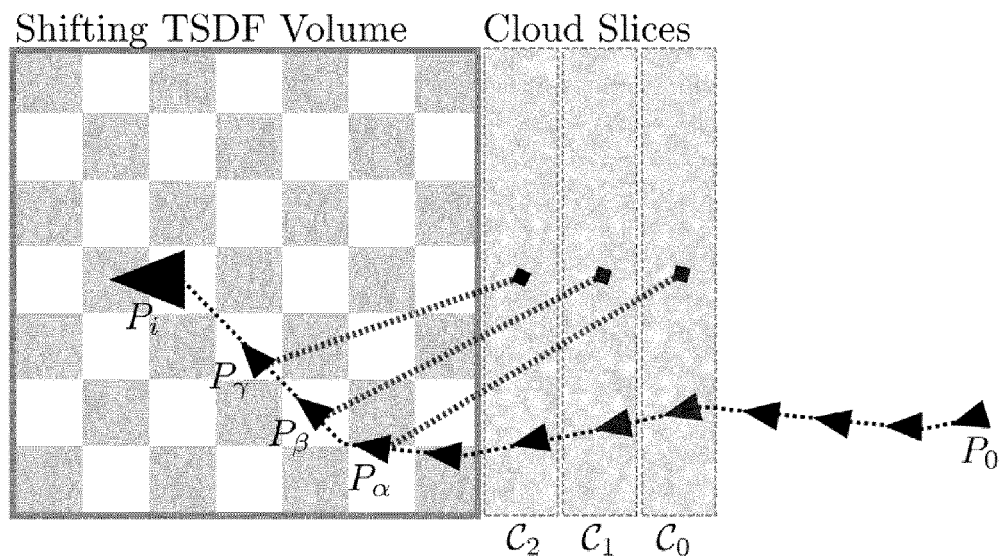
FIG. 2 shows the relationship between camera poses, TSDF and cloud slices in an embodiment of the present invention.

FIG. 2 shows the relationship between camera pose estimates, the TSDF volume and the extracted "slices" of the surface, hereafter referred to as a "cloud slices".

Here, the initial camera pose is denoted $P_0$. As discussed previously, the TSDF volume virtually translates with the camera's own movement. Since it is inefficient to do this for every movement of the camera, as discussed in Whelan et al above, the TSDF only translates when the camera movement is greater than some threshold, typically a fraction, for example, ⅓, of the TSDF volume imaged by the sensor at any given time. This is shown in FIG. 2 where each small black square in the pose graph represents a camera pose for each camera frame, whereas each large dark triangle (including $P_0$, $P_\alpha$, $P_\beta$, $P_\gamma$ and $P_i$) are camera poses where the TSDF volume shifted. In FIG. 2, $P_i$ is the latest camera pose. Three cloud slices which have been extracted from the moving volume are also shown, labelled $C_0$, $C_1$ and $C_2$. The association between the poses that caused the creation of these slices is shown as a broken line between $P_\alpha$, $P_\beta$, and $P_\gamma$ and cloud slices $C_0$, $C_1$ and $C_2$ respectively.

This chain of poses, including both small unlabelled black squares and large black triangles is commonly known as a pose graph in the SLAM community. Between each consecutive pose there exists a transformation or a "constraint". If we start at pose $P_0$, there is a transformation computed between the camera frame at $P_0$ and the next camera frame (using some odometry estimation method) that informs us of the position of the next camera frame relative to $P_0$. By incrementally chaining these frame-by-frame transformations together we get the full trajectory of the camera through space and time, as well as the correct positions of any parts of the map (i.e. cloud slices) relative to the global coordinate frame.

One can thus imagine the camera trajectory as being a graph, where each edge contains a rigid transformation between individual camera poses.

In one approach to achieving global consistency, the system recognises when the sensor revisits previously mapped areas. Many place recognition techniques based on visual information alone have been published. Systems according to the present invention can employ any such visual recognition systems, and indeed implementations could equally use non-visually based place recognition systems, for example, GPS (where this is available), IEEE 802.15.4 or ZigBee based device ranging where fiduciary information is used to determine the level of drift as a sensor moves through a pose graph. Other approaches for determining drift include distributing emitters with known locations around an environment to be mapped. These can transmit readily identifiable signatures which can be identified either optically, acoustically or for example, in the infra-red so that sensor drift can be determined without necessarily requiring loop closure.

Nonetheless, one embodiment of the invention employs the DBoW system, disclosed in "Real-Time Loop Detection with Bags of Binary Words" by Dorian Gálvez-López, Juan D. Tardós, In International Conference on Intelligent Robots and Systems, September 2011. As the camera moves through the environment, it periodically inputs an image to the place recognition system (e.g. when the camera movement exceeds a threshold). For each input, the system computes a set of visual features based on the image data which are used in combination to provide a global description of the image. These are essentially invariant descriptions of the pixel-intensity in small patches of the image that are assumed to be somewhat unique. As each new image is input, the DBoW place recognition system (i) attempts to match the associated features against those of all previous images (i.e. to detect a loop closure), and (ii) augments its database of images and associated features with the new image data (i.e. it adds this place to the system).

Once the DBoW system finds a match, a number of additional checks are performed. Firstly, the system attempts to match the features between the proposed pair of matching images. If there are enough corresponding features, the system attempts to compute a rigid transformation between the two images (essentially a transformation which brings one camera into alignment with the other) using, for example, standard optimisation techniques such as RANSAC and Levenberg-Marquardt. If this succeeds, the alignment can be refined by matching the depth maps of both camera frames using, for example, ICP (Iterative Closest Point, a standard local alignment technique). If the alignment is good enough, the match is accepted. The refined transformation can be regarded as a new edge in the pose graph linking, or looping back, two cameras locations which were previously unrelated, by providing a constraint between the two poses.

Within DBoW, a standard feature type, such as Speeded Up Robust Features (SURF) disclosed in Herbert Bay, Andreas Ess, Tinne Tuytelaars, Luc Van Gool "SURF: Speeded Up Robust Features", Computer Vision and Image Understanding (CVIU), Vol. 110, No. 3, pp. 346-359, 2008 can be employed to determine when loop closure has occurred.

Figure 4:
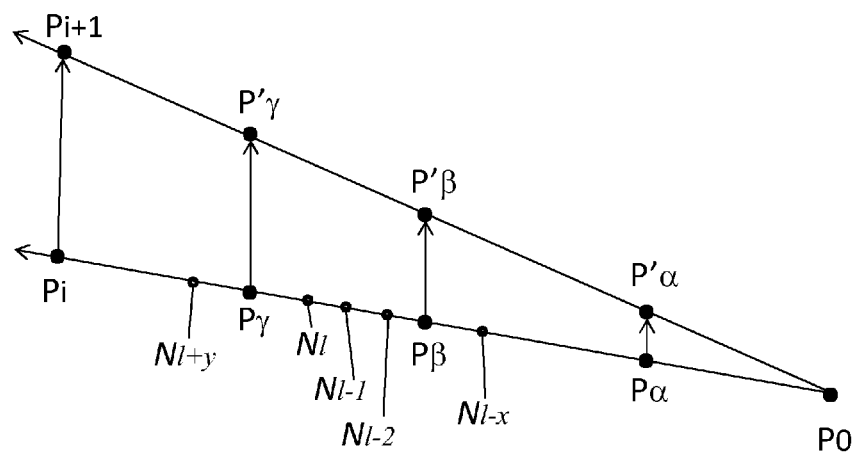
FIG. 4 shows schematically an initial mapping for a single dimension from a pose graph P to a corrected pose graph P' based on detected drift employed in an embodiment of the present invention.

Referring to FIG. 4, which shows a simple monotonic drift in one dimension of x, y, z, pitch, yaw or roll as a camera moves from pose $P_0$ through to $P_i$. In this case, the sensor's actual position drifts from the pose graph node locations $P_\alpha$, $P_\beta$, $P_\chi$ . . . $P_i$, until in this case loop closure is detected at position $P_i$. This tells the system that the sensor is now in fact at location $P_{i+1}$. It will be appreciated however that drift may not be monotonic and if for example, a camera were traversing a building with turns in many corridors or stairs, then the drifting path might in fact (repeatedly) cross with the actual path (or vice versa).

Whether by detecting loop closure or otherwise, the detected drift, i.e. the edge connecting Pi to Pi+1 shows the net extent of inconsistency within the pose graph by comparison to the actual camera path. The new edge in the graph that corrects for this inconsistency now enables the graph to be made consistent using a technique known as pose graph optimisation whereby all camera poses in the graph P are optimised based on all constraints in a manner that attempts to minimize the overall error in the graph. A large number of libraries and techniques are available to accomplish this task.

One embodiment of the present invention is based on an existing non-linear least squares solver known as iSAM, disclosed in "iSAM: Incremental Smoothing and Mapping" by M. Kaess, A. Ranganathan, and F. Dellaert. In IEEE Trans. on Robotics, TRO, vol. 24, no. 6, December 2008, pp. 1365-1378. iSAM takes a pose graph P and all constraints between all camera poses (including loop closures) and minimises the inconsistency in the graph, essentially correcting the drift in the trajectory of the camera. The result is a refined camera trajectory P' that more accurately represents the true motion of the camera.

At this point we have a corrected pose graph trajectory comprising $P_0, \ldots P'_\alpha, P'_\beta, P'_\chi, \ldots, P_{i+1}$, but the map is still uncorrected. The following section describes an embodiment for reflecting the correction of the camera trajectory in the dense map in a computationally efficient manner.

As discussed previously, the extracted map is in the form of a point cloud (or mesh). Each point, or vertex, has a position in 3D space. Given the fact that the surface may be locally consistent but globally may drift, a transformation and in particular a non-rigid transformation can be used on the map to correct for drift.

An enormous amount of literature exists in the computer graphics community on non-rigid deformations, typically applied to triangular meshes for animation or manipulation. There are a number of different approaches, and some require that the input models meet strict constraints, such as a closed fully connected mesh.

One embodiment of the present invention is based partially on the approach disclosed in "Embedded deformation for shape manipulation," by R. W. Sumner, J. Schmid, and M. Pauly, in ACM SIGGRAPH 2007 papers, SIGGRAPH '07, (New York, N.Y., USA), ACM, 2007. Here the actual space is non-rigidly deformed, such that any 3D point lying within a given area in space is non-rigidly deformed according to the current deformation parameterisation.

Figure 3:
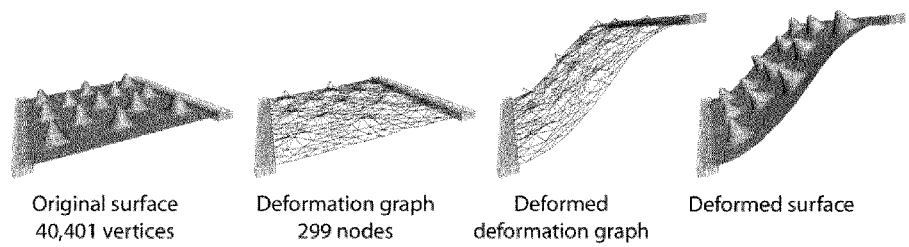
FIG. 3 shows an exemplar prior art surface and deformation graph.

Referring to FIG. 3, a typical application of Sumner involves real-time model manipulation to effectively click and drag a 3D model of a subject represented by a set of vertices in 3D space and have it deform in real-time. A deformation graph comprising a set of deformation nodes can be created for example, as a uniformly sampled subset of the vertices that make up the 3D model. Each deformation node is connected in a k-nearest neighbour fashion, typically k=4 to other nodes of the deformation graph. Each deformation node comprises coefficients for an affine transformation in the form of a 3×3 rotation matrix and a 3×1 translation vector. Each vertex in the model is effected by the transformation contained in the four nearest nodes to it using a weighted sum of these transformations. To perform the actual deformation, a user adds single vertex constraints, for example, by clicking and dragging a vertex of the model to a displaced location. The entire deformation graph is then optimised (in a non-linear least squares setting) such that the user specified constraints (vertex positions) are matched, while the overall deformation graph is locally consistent, allowing non-rigidity in the rotation but attempting to maintain as much rigidity as possible.

One issue with implementing the present invention based on the approach of Sumner is that of associating each vertex in the map with a set of deformation nodes (that is, the nodes nearby each vertex which are to be combined to produce the final per-vertex transformation to compensate for drift). Employing the transformations between pose graph nodes P and P' as deformation graph nodes, could mean assigning deformation nodes to potentially unrelated vertices. For example, the association between pose $P_\alpha$ and vertices in cloud slice $C_0$ in FIG. 2 is somewhat offset; there is at least a distance of half the TSDF volume size between the pose and the vertices.

Figure 5:
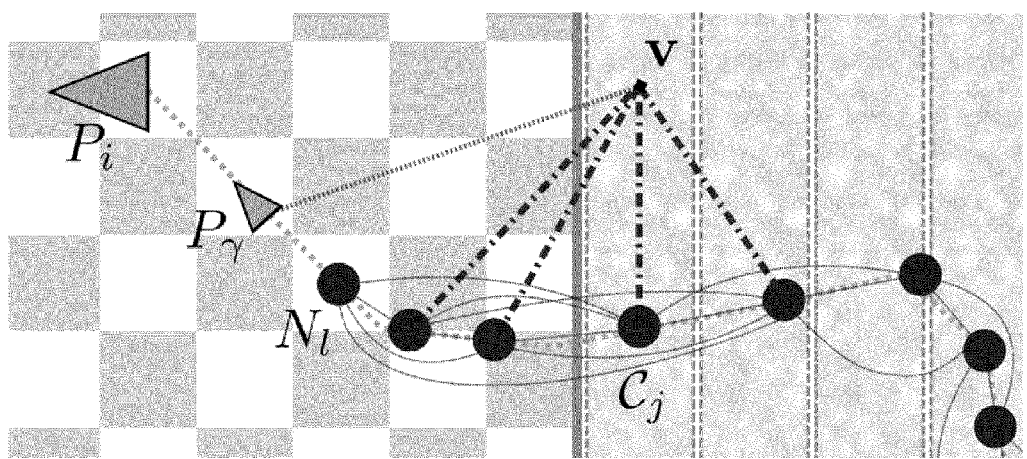
FIG. 5 is an enhanced version of FIG. 2 showing vertex association for deformation graph nodes in an embodiment of the present invention.

Referring to FIGS. 4 and 5, in embodiments of the present invention, sequential camera poses are sampled and interconnected as a sequence of nodes N in the deformation graph. Thus, the deformation graph nodes N lie on the path of the pose graph P and are typically more closely spaced than the pose graph nodes P, but less closely spaced than the original sequential camera poses. It will be appreciated that this sampling can be performed incrementally as the camera trajectory is created.

In order to determine which deformation graph nodes N are to be employed in the transformation of vertex coordinates to compensate for drift, firstly, the camera pose P associated with each cloud slice, denoted $C_{jP}$, is chosen as a starting point. The system then back traverses the pose graph towards pose P0 in order to find the k-closest nodes in the deformation graph for each vertex. FIG. 5 provides a visual example where for cloud slice $Cj=C_{jP}$ the k=4 deformation nodes before pose $P\gamma$ from $N_{l-1}$ are chosen.

FIG. 5 thus shows the relationship between nodes sampled from the pose graph as deformation graph nodes and vertex associations for the final non-rigid transformation. Here, the circular nodes in the pose graph are the camera poses from the pose graph that have been sampled as nodes in the deformation graph. The camera pose $P_\gamma$ resulted in the creation of cloud slice $C_j$. For a vertex v in $C_j$, $P_\gamma$ is used as an entry point to the dense pose graph (here $P_\gamma$ is equal to $C_{jP}$). Here, we back traverse to find $N_l$, the closest sampled node to v. From there, we continue to back traverse the set of (circular) deformation graph nodes to find the closest k-nodes to v. As the production of each cloud slice is an incremental process, the association of deformation graph nodes and the calculation of their blending function weights for each vertex can be calculated incrementally as they are mapped i.e. there is no requirement to wait for loop closure if this is being used to determine drift.

Once the deformation graph node locations N and sensor drift across the graph are known, the coefficients for the deformation graph nodes are ready to be optimised. Given the incremental execution, the map can be optimised and corrected at any time during the mapping process, online.

The step of constraining the deformation according to the corrected camera trajectory involves computing the transformation at each node of the deformation graph that, when applied to each vertex of the input mesh, will deform it so as to bring corresponding points of the environment into alignment (i.e. closing the loop or compensating for drift), whilst at the same time minimising the distortion of the local geometry across the map.

In Sumner et al, a human operator starts by choosing a set of control points on the input mesh and specifying a set of displacements for those points. That is, a user picks one point and specifies where it should lie after the deformation, with the deformation graph being optimised to bring the point to that location.

The present embodiment uses the uncorrected camera trajectory P as an initial condition for the deformation graph i.e. deformation graph node coefficients are set to null, and the positions of each camera pose in the corrected trajectory P', derived using iSam as described above, as the final desired vertex positions in the deformation. Deformation graph optimisation attempts to define deformation graph node coefficients which pull the uncorrected map vertices towards a corrected map around the optimised camera trajectory.

In the embodiment, the matched image features discussed above are also used as point constraints for the deformation, to ensure a tight match at the point of loop closure in the map as explained in more detail below.

All of the above is achieved through an optimisation framework where each constraint is modelled through the use of an associated cost function, and where the optimisation is performed over a weighted combination of these functions.

Specifically, in the embodiment four separate cost functions are combined. Two cost function components, $E_{rot}$ and $E_{reg}$, are taken from Sumner and attempt to preserve the smoothness and local geometry of the map. $E_{conP}$ is adapted from Sumner's user control point alignment cost function and is based on the desired pose graph transformation from P to P'. $E_{feat}$ attempts to ensure that features from the maps re-project to the correct locations in the camera view after the map is deformed—again this is based on the pose graph update from P to P'.

The final total cost function is defined as:

$$E = w_{rot}E_{rot} + w_{reg}E_{reg} + w_{conP}E_{conP} + w_{feat}E_{feat}$$

where, each of the $w_i$ are weighting coefficients to allow the relative influence of each of the individual costs to be controlled. In one implementation the weights are as follows:

$$w_{rot}=1; w_{reg}=10; w_{conP}=100; w_{feat}=100$$

Taking each of the costs in turn, the $E_{conP}$ term is used to ensure that the deformation agrees with the pose graph update (e.g. due to loop closure). If we denote the pose graph before and after the update to be P and P', respectively, then $E_{conP}$ is defined as:

$$E_{conP} = \sum_i \|\phi(P_{i_t}) - P'_{i_t}\|_2^2$$

where, $\phi(\ )$ is the mapping induced by a given iteration of deformation graph i.e. a given set of coefficients for the nodes of the deformation graph N. Hence $\phi(P_{i_t})$ is the position $P_{i_t}$ maps to, whereas $P'_{i_t}$ is where we wish it to map. The closer these two position, the lower the cost.

When we close a loop in the system, by definition, this implies that a previously mapped region has re-entered the field of view of the camera. However, given the drift, if we re-project this region of the map into the current image then the map data and the image data will not be aligned. On the other hand if the deformation graph nodes accurately adjust for the drift then the features should be coincident. $E_{feat}$ captures this constraint by computing the sum-of-squared distance between a set of corresponding features $V_q$. The cost is defined as:

$$E_{feat} = \sum_i \left\| \phi((P_{i_R} V_q) + P_{i_t}) - ((P'_{i_R} V_q) + P'_{i_t}) \right\|_2^2$$

Here the $\phi((P_{i_R} V_q)+P_{i_t})$ term first projects $V_q$ into the frame of reference of $P_i$ and then performs the $\phi(\ )$ mapping i.e. bringing into alignment with the new region of the map. The $((P'_{i_R} V_q)+P'_{i_t})$ term projects $V_q$ into the frame of reference of $P'_i$. The final cost is the sum of the squares of the residuals between these points.

The following two error components are based on the characteristics of the deformation graph node coefficients. $E_{rot}$ is defined as:

$$E_{rot} = \sum_l \|N_{l_R}^T N_{l_R} - I\|_F^2$$

where, the summation is taken over all of the deformation graph nodes, $N_l$, and $N_{l_R}$ is the current rotation at $N_l$. Note that the $\| \ \|_F^2$ here denotes the Frobenius norm which provides a means of measuring the difference between two matrices. Intuitively this cost increases as the rotational component becomes more significant and less like a pure rotation, i.e. becomes non-rigid, and hence has the effect of penalising local changes in orientation.

The $E_{reg}$ term is a regularisation cost that penalises deformation graph nodes whose transformations are significantly different from their neighbouring nodes. This has the effect of ensuring that the surface deformation varies smoothly across the surface. The cost is defined as:

$$E_{reg} = \sum_{l} \sum_{n \in \mathcal{N}(N_l)} \left\| N_{l_R}(N_{n_g} - N_{l_g}) + N_{l_g} + N_{l_t} - (N_{n_g} + N_{n_t}) \right\|_2^2$$

where, $N_{i_g}$ is the position of node i, $N_{l_R}$ is as above and $N_{i_t}$ is the translational component of the transformation of that node. Again this cost is computed over all nodes, where for each deformation graph node, $N_l$, we consider all nodes in the neighbourhood, $\mathcal{N}(N_l)$.

Given the above the definitions, combined into a single weighted cost function E, computation of the final deformation graph can be achieved through the use of a standard iterative non-linear minimisation techniques e.g. Gauss-Newton optimisation. Such techniques iteratively adjust deformation graph node coefficients until a minimum error E is reached and an optimised set of deformation graph node coefficients is determined.

To minimise the cost using Gauss-Newton, embodiments compute the derivative of the cost functions with respect to the coefficients of all deformation nodes. This requires the population of a large Jacobian matrix. The Jacobian will have a column for each variable being estimated, that is, 12 columns for each deformation graph node (the 3×1 translation and 3×3 rotation matrix). The number of rows in the Jacobian matrix depends upon the number of deformation nodes, the number of poses and the number of feature constraints. If we assume we use k-connectivity for the deformation graph, there will be 6+(3*k) rows per deformation node, 3 rows for each camera pose constraint and 3 rows for each visual feature constraint. These numbers come from taking the derivative of each cost function with respect to the deformation node coefficients (the rotation and translation stored at each node). As well as a Jacobian matrix, a residual vector is also computed. This has the same number of rows as the Jacobian matrix and one column. Each row is computed as the result of the cost function for a particular variable being estimated. From this point, an improved solution (i.e. set of coefficients for each deformation node N) can be computed by multiplying the transposed Jacobian by the residual and then multiplying the transposed Jacobian by the Jacobian to get a square information matrix and factorising it. The factorisation can be manual (by multiplying the inversed information matrix by the Jacobian residual product) or by Cholesky factorization. Given that the Jacobian is sparse (i.e. many zero entries), the system can be solved using sparse Cholesky decomposition (http://www.cise.ufl.edu/research/sparse/cholmod/). This population of the Jacobian and residual is iterated until the error E is minimised at which point the deformation graph node coefficients are set.

Again, as the deformation graph node coefficients and the blended weights of these coefficients for each vertex can be computed incrementally, the cost for correcting multi-million vertex maps is quite cheap, and by running the map correction process asynchronously with a front end tracker which detects drift, through loop closure or otherwise, maps can be corrected on-the-fly in real-time while mapping is taking place.

Figure 6:
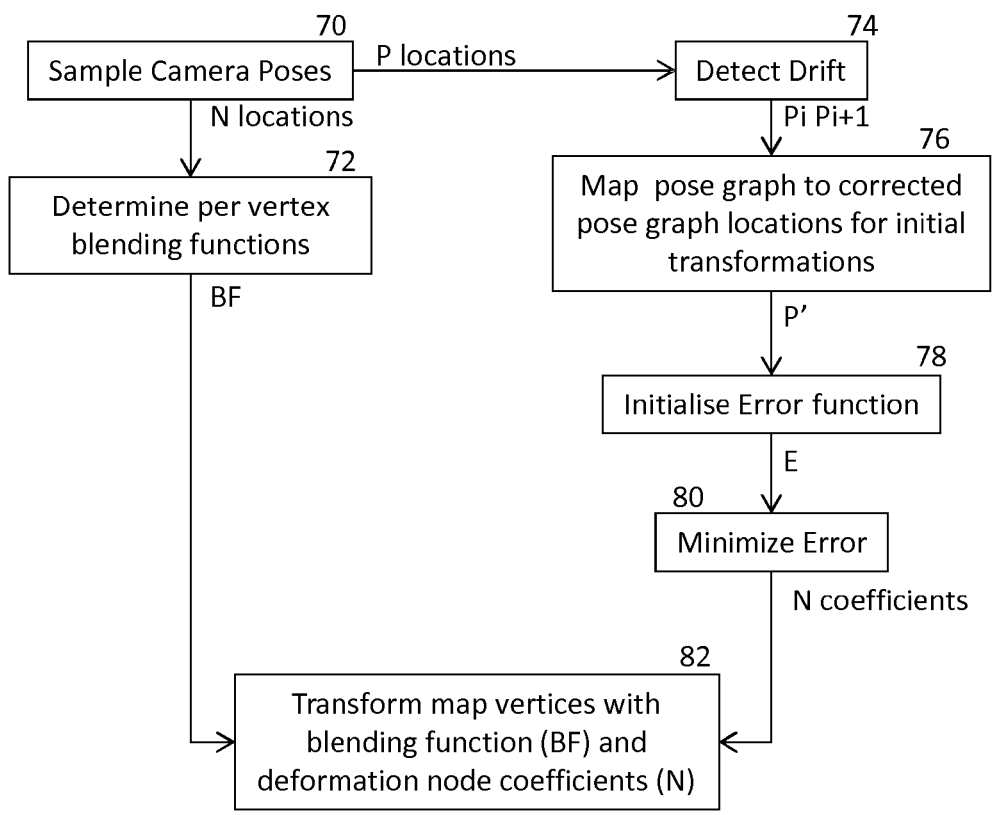
FIG. 6 illustrates schematically a method according to an embodiment of the present invention.

FIG. 6 illustrates the above approach graphically. As a camera moves, a sequence of pose graph node P and deformation graph node N locations are chosen, step 70. Knowing the locations of deformation graph nodes N, the per vertex blending functions (BF) of the k-nearest nodes of the deformation graph can be calculated, step 72. In parallel, drift can be detected at pose graph location $P_i$ mapping the location to actual location $P_{i+1}$, step 74. This allows the updated pose graph P' to be calculated, step 76. Knowing the initial transformation of the pose graph nodes from P to P', an initial error function value E can be determined, step 78. Minimizing this error across the nodes of the deformation graph, then provides a set of non-rigid transformation coefficients for each node of the deformation graph, step 80. Now either on a per vertex basis or across the map as a whole, vertices can be transformed to their real locations based on knowledge of actual camera drift, step 82. Thus vertices can be transformed to their real locations where they can be addressed with real world coordinates; or the transformation function coefficients can be inverted to allow an application to make a call on a mapping function looking for colour information at a real-location and reading this from an untransformed originally sampled vertex.

The invention claimed is:

1. A method for mapping an environment comprising:
   moving a sensor along a path from a start location (P0) through said environment, said sensor generating a sequence of images, each image associated with a respective estimated sensor location and comprising a point cloud having a plurality of vertices, each vertex comprising an (x,y,z)-tuple and image information for said tuple,
   sampling said sequence of estimated sensor locations to provide a pose graph (P) comprising a linked sequence of nodes, each corresponding to a respective estimated sensor location,
   for each node of the pose graph (P), acquiring a respective cloud slice (C) comprising at least of portion of said point cloud for said sampled sensor location;
   determining a drift between an actual sensor location ($P_{i+1}$) and an estimated sensor location ($P_i$) on said path;
   providing a corrected pose graph (P') indicating a required transformation for each node of the pose graph (P) between said actual sensor location ($P_{i+1}$) and said start location (P0) to compensate for said determined drift;
   sampling said sequence of estimated sensor locations to provide a deformation graph (N) comprising a linked sequence of nodes, each corresponding to respective estimated sensor locations along said path,
   for at least a plurality of said vertices in said cloud slices, identifying a closest set of K deformation graph nodes and determining a respective blending function based on the respective distances of said identified graph nodes to a vertex;
   determining transformation coefficients for each node of said deformation graph as a function of the required transformation for each node of the pose graph (P) to compensate for said determined drift; and
   transforming tuple coordinates for a vertex to compensate for sensor drift as a function of said blending function and said transformation coefficients for said K deformation graph nodes closest to said vertex.

2. A method according to claim 1 wherein said step of determining a drift comprises:
   for at least some images of said sequence of images, identifying at least one distinctive feature;

responsive to identifying matching distinctive features in two images, a first one of which was acquired at said start location and a second one of which was acquired at an estimated sensor location ($P_i$) along said path, aligning said matched distinctive feature in said images to determine the drift between an actual sensor location ($P_{i+1}$) and said estimated sensor location ($P_i$).

3. A method according to claim 1 wherein said transformation coefficients include coefficients defining at least: a translation, a rotation and a projection for a vertex.

4. A method according to claim 3 wherein said transformation coefficients further include coefficients defining: stretching, shearing, contraction or twisting for a vertex.

5. A method according to claim 1 wherein said image information includes at least intensity information for a vertex.

6. A method according to claim 5 wherein said image information includes colour information for a vertex.

7. A method according to claim 1 wherein said transformed vertex comprises a vertex of the point cloud.

8. A method according to claim 1 wherein said transformed vertex comprises a vertex comprising real-world tuple coordinates and further comprising retrieving image information from said point cloud based on a transformation of said real-world tuple coordinates based on an inversion of said transformation coefficients.

9. A method according to claim 1 wherein determining said transformation coefficients comprises iteratively: calculating a set of candidate transformation coefficients for said deformation graph nodes (N); calculating an error value (E) as a function of the projected transformations of said pose graph nodes ($\phi(\,)$) based on said set of candidate deformation graph transformation coefficients; and choosing a set of deformation graph transformation coefficients when said error is minimized.

10. A method according to claim 9 wherein said error value E comprises:

$$E = w_{rot}E_{rot} + w_{reg}E_{reg} + w_{con_P}E_{con_P} + w_{feat}E_{feat}$$

where $w_{rot}$, $w_{reg}$, $w_{con_P}$ and $w_{feat}$ are blending coefficients and where $E_{rot}$ is a function of the extent of rotation produced by a candidate set of deformation graph node coefficients;

$E_{feat}$ is a function of a difference between the location of a distinctive feature in an image associated with a pose graph node induced by a candidate set of deformation node coefficients and the required transformation of the distinctive feature;

$E_{reg}$ is a function of the variation in extent of translation and/or rotation produced by a candidate set of deformation graph node coefficients; and $E_{con_P}$ is a function of a difference between the locations of pose graph nodes induced by a candidate set of deformation node coefficients and the required transformation of the pose graph nodes.

11. A method according to claim 10 wherein:

$$w_{rot}=1; w_{reg}=10; w_{con_P}=100; w_{feat}=100.$$

12. A method according to claim 10 wherein:

$$E_{con_P} = \sum_i \|\phi(P_{i_t}) - P'_{i_t}\|_2^2$$

where, $\phi(\,)$ is a translational mapping of a pose graph node ($P_i$) induced by a candidate set of deformation node coefficients and $P'_{i_t}$ is the required translation of the pose graph node ($P_i$).

13. A method according to claim 10 wherein:

$$E_{feat} = \sum_i \|\phi((P_{i_R}V_q) + P_{i_t}) - ((P'_{i_R}V_q) + P'_{i_t})\|_2^2$$

where $\phi((P_{i_R}V_q)+P_{i_t})$ indicates a rotational (R) and translational (t) mapping of a distinctive feature $V_q$ from an image associated with pose graph node $P_i$ induced by a candidate set of deformation node coefficients and $((P'_{i_R}V_q)+P'_{i_t})$ indicates the required mapping of the feature $V_q$.

14. A method according to claim 10 wherein:

$$E_{rot} = \sum_l \|N_{l_R}^T N_{l_R} - I\|_F^2$$

where $N_l$ is a set of deformation graph nodes, $N_{l_R}$ is the rotation at $N_l$ for a candidate set of deformation node coefficients, and $\|\,\|_F^2$ is the Frobenius norm.

15. A method according to claim 10 wherein:

$$E_{reg} = \sum_l \sum_{n \in N(N_l)} \|N_{l_R}(N_{n_g} - N_{l_g}) + N_{l_g} + N_{l_t} - (N_{n_g} + N_{n_t})\|_2^2$$

where, $N_{i_g}$ is the position of deformation graph node i, $N_{i_t}$ is the translational component of the transformation and $N_{i_R}$ is the rotational component at node $N_l$ for a candidate set of deformation node coefficients.

* * * * *